United States Patent [19]

Pitsch et al.

[11] Patent Number: 5,155,650
[45] Date of Patent: Oct. 13, 1992

[54] THYRISTOR FAIL-SAFE

[75] Inventors: Daniel M. Pitsch, Minneapolis; Gary F. Nault, Bloomington, both of Minn.

[73] Assignee: ADC Telecommunications, Inc., Minneapolis, Minn.

[21] Appl. No.: 811,878

[22] Filed: Dec. 19, 1991

Related U.S. Application Data

[63] Continuation of Ser. No. 747,984, Aug. 21, 1991, abandoned.

[51] Int. Cl.⁵ .............................................. H02H 9/04
[52] U.S. Cl. ..................... 361/119; 361/56; 361/127
[58] Field of Search ............ 361/119, 127, 56, 124, 361/120; 337/32

[56] References Cited

U.S. PATENT DOCUMENTS 4,233,641  11/1980  Baumbach ........................... 361/127
4,876,621  10/1989  Rust et al. ........................... 361/127

Primary Examiner—Todd E. DeBoer
Attorney, Agent, or Firm—Merchant, Gould, Smith, Edell, Welter & Schmidt

[57] ABSTRACT

A fail-safe device is provided for a thyristor where the thryistor has a body member with extending tip, ring and ground leads. The fail-safe device includes an electrically conductive spring member having first, second and third contact ends. The spring member is sized to be fitted over the thyristor body with the first contact end opposing the tip lead, the second contact end opposing the ring lead and the third contact end opposing the ground lead. A dielectric spacer is provided disposed to space the first and second contact ends from the tip and ring leads. The spacer means is formed from a material selected to deform under a force of the bias of the spring at an elevated temperature generated in response to the thyristor failing to ground the tip or ring leads during an overvoltage condition.

6 Claims, 4 Drawing Sheets

THYRISTOR FAIL-SAFE

This is a continuation, of application Ser. No. 07/747,984, filed Aug. 21, 1991 abandoned.

BACKGROUND OF THE INVENTION

1. Field of the Invention

This invention pertains to an overvoltage protector element in the form of a thyristor. More particularly, this invention pertains to a fail-safe device for use with such a thyristor.

2. Description of the Prior Art

In the telecommunications industry, the use of an overvoltage protection element is well known. An example of such a use is shown in commonly-assigned and copending U.S. Pat. No. 4,741,711.

In the aforementioned patent, a gas tube overvoltage protector element is employed. However, it is also known in the art to use a thyristor as an overvoltage protector element. A thyristor is a solid-state element which senses voltage. It is high-speed and may react to a lower voltage than that presently attainable with gas tubes. Also, the solid-state thyristor has a greater accuracy than the gas tubes.

The thyristor has tip and ring leads and a ground lead. The tip and ring leads are electrically connected to the ground lead in response to a sensed overvoltage condition. During periods of prolonged grounding, the thyristor achieves an elevated temperature.

A short period of grounding may result from a brief overvoltage condition. This could occur from lightening strikes. Prolonged grounding may result from prolonged overvoltage conditions. For example, a high voltage power line may fall and rest on a telephone line. This would result in a prolonged overvoltage condition on the telephone line.

Any grounding through the thyristor will increase the temperature of the thyristor. Prolonged grounding resulting from prolonged overvoltage conditions will result in significant temperature increases. Increased temperature present fire and other risks including personal injury exposure. To minimize these risks, prior art overvoltage protectors utilized so called fail-safe devices. Such devices would bypass the grounding of a thyristor and directly ground the tip or ring leads to the ground lead. As a result, extreme increases in temperature would be avoided.

The most common prior art fail-safe devices were commonly used with the aforementioned gas tube protector elements. Typically, such devices would include dielectric spacers which would space a grounding clip lead from contact areas on the protector element. In the event of elevated temperature, the dielectric spacer would deform or melt.

Within this application, a failed overvoltage protector element means any element which is experiencing elevated temperature resulting from prolonged overvoltage conditions. The term does not necessarily mean a faulty element.

It is an object of the present invention to provide a fail-safe device for a thyristor which has enhanced reliability and which is susceptible to low-cost manufacture and assembly.

SUMMARY OF THE INVENTION

According to a preferred embodiment of the present invention, a fail-safe device is provided for a thyristor where the thyristor has a body member with extending tip, ring and ground leads. The thyristor includes means for grounding either of the tip or ring leads upon detection by the thyristor of an overvoltage condition. The thyristor is characterized by its attaining an elevated temperature in event of prolonged grounding. The fail-safe device comprises an electrically conductive spring member having first, second and third contact ends. The spring member is sized to be fitted over the thyristor body with the first contact end opposing the tip lead, the second contact end opposing the ring lead and the third contact end opposing the ground lead. The spring member is dimensioned for the first, second and third contact ends to be biased toward the tip, ring and ground leads. A spacer is provided to space the contact ends against their bias from the thyristor leads. The spacer is formed from material selected to deform under a force of the bias at an elevated temperature to permit the ends to move under influence of the bias to a position with the tip, ring and ground leads in electrical contact with the first, second, and third contact ends.

DESCRIPTION OF THE PREFERRED EMBODIMENT

Figure 1:
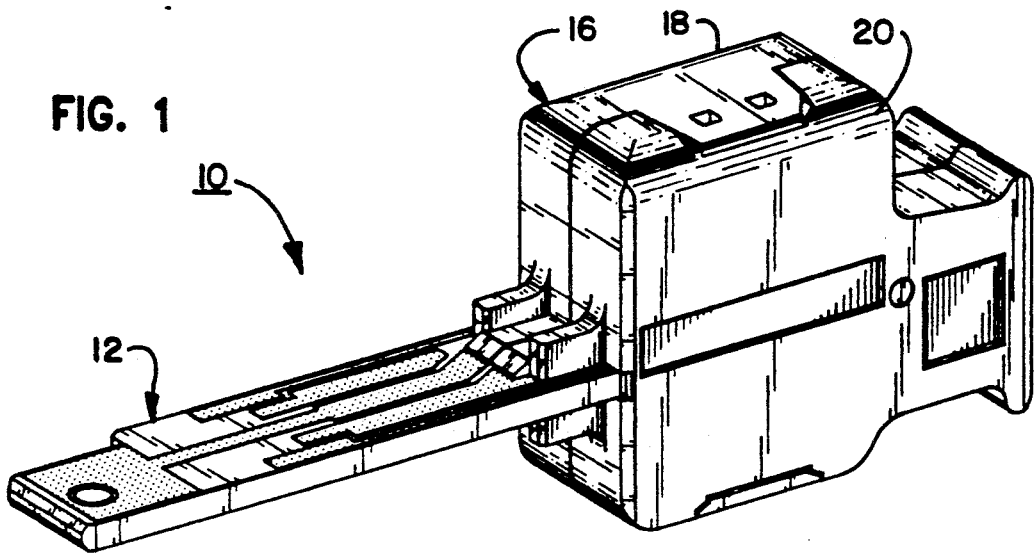
FIG. 1 is a perspective view of an overvoltage protection device.
Figure 2:
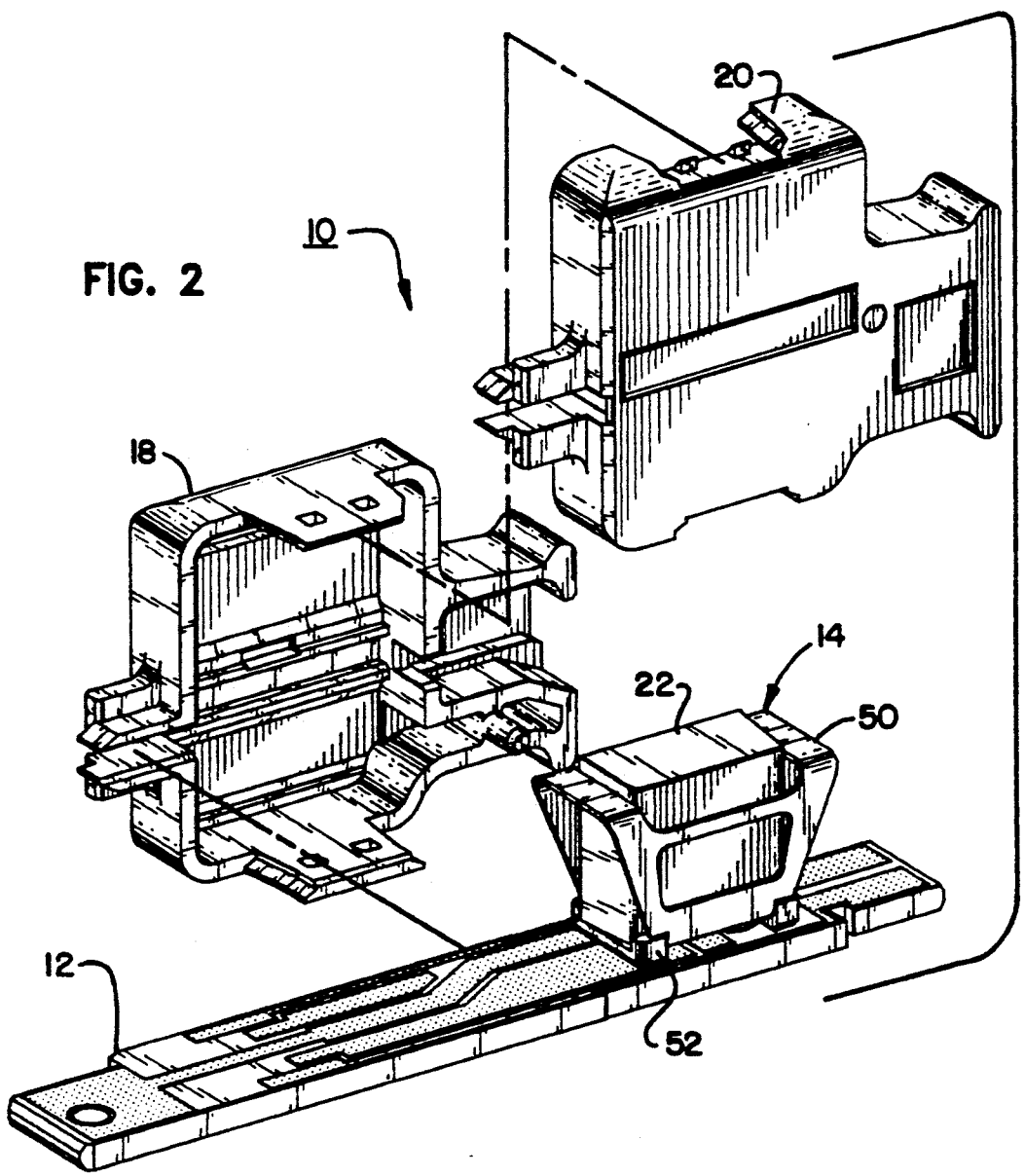
FIG. 2 is an exploded view of the device of FIG. 1.

With reference now to the various drawing figures in which identical elements are numbered identically throughout, a description of the preferred embodiment will now be provided. As shown in FIGS. 1 and 2, an overvoltage protection device 10 is shown. The device 10 is intended for use in a connector block assembly such as that shown in the aforementioned and commonly-assigned U.S. Pat. No. 4,741,711.

The device 10 includes a printed circuit board 12, an overvoltage protection assembly 14 and a housing 16 formed by mating halves 18 and 20. The housing 16 surrounds the assembly 14 in the assembled state as shown in FIG. 1.

Figure 3:
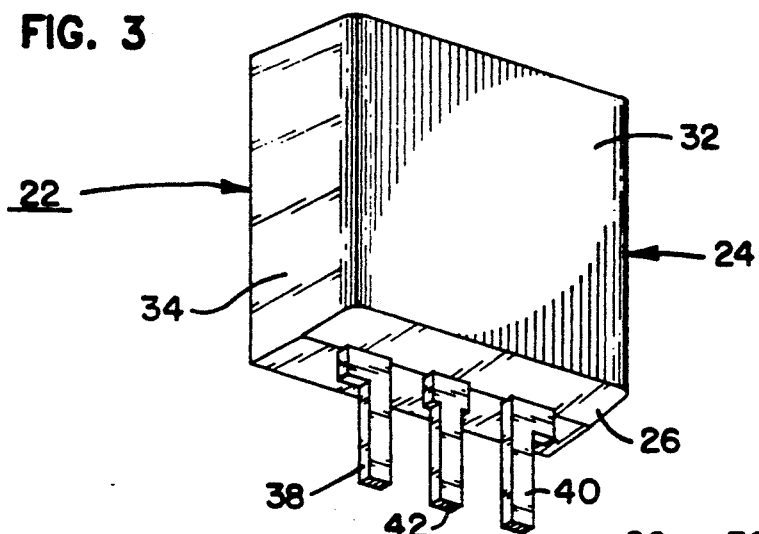
FIG. 3 is a side, end and bottom perspective view of a thyristor.

In the present invention, the overvoltage protection for the device 10 is provided by a thyristor 22. Shown with reference to FIGS. 3 and 4, the thyristor 22 includes a body member 24 having a common or bottom surface 26 and an opposite top surface 28. Side walls 30,32 and end walls 34,36 join the top surface 28 with the bottom surface 26.

A tip lead 38, ring lead 40 and ground lead 42 extend in parallel, spaced apart linear alignment from bottom surface 26. The thyristor 22 includes means (not shown) for grounding either of the tip or ring leads 38,40 to the ground lead 42 upon detection by the thyristor of an overvoltage condition. The thyristor 22 is characterized by its attaining an elevated temperature in the event of prolonged grounding. It will be appreciated by those skilled in the art that a thyristor 22 such as that shown and described forms no part of this invention per se and is a commercially-available item.

With best reference to FIGS. 4-10, the overvoltage protection assembly 14 is shown as including thyristor 22, a spring member 50 and a spacer 52. The spring member 50 and spacer 52 cooperate to define a fail-safe device 54 (see FIG. 6).

Figure 11:
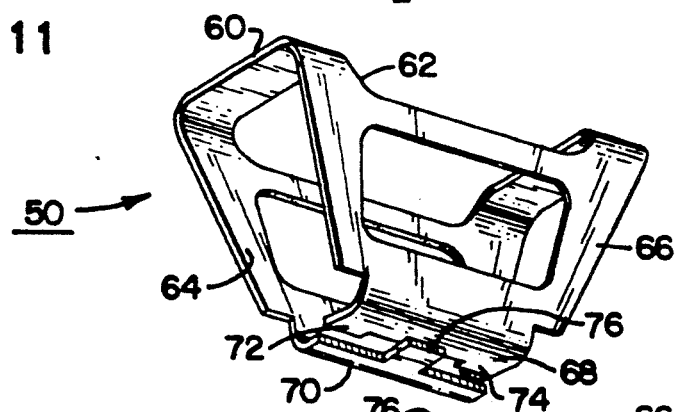
FIG. 11 is an end, side and bottom perspective view of a spring member of the present invention.
Figure 12:
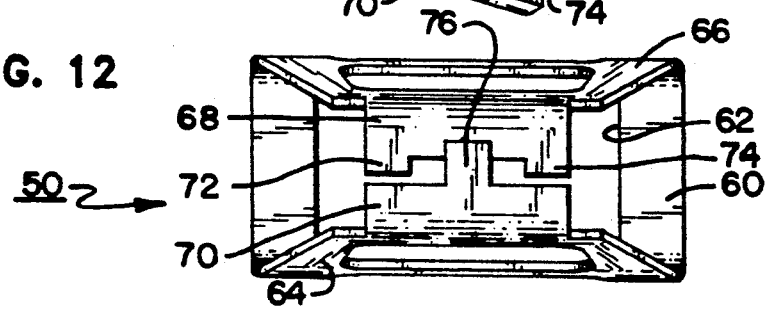
FIG. 12 is a bottom plan view of the spring member of FIG. 11.
Figure 13:
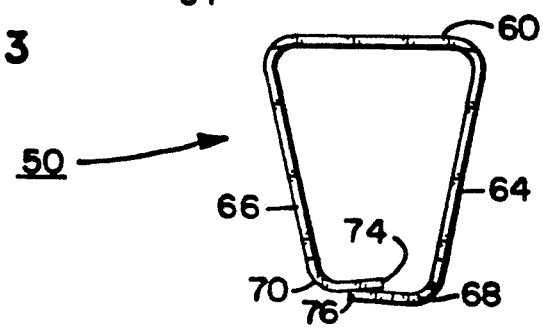
FIG. 13 is an end elevation view of the spring member of FIG. 11.

The spring member 50 is shown separately in FIGS. 11-13. Spring member 50 is formed of electrically conductive material (preferably beryllium copper).

Figure 4:
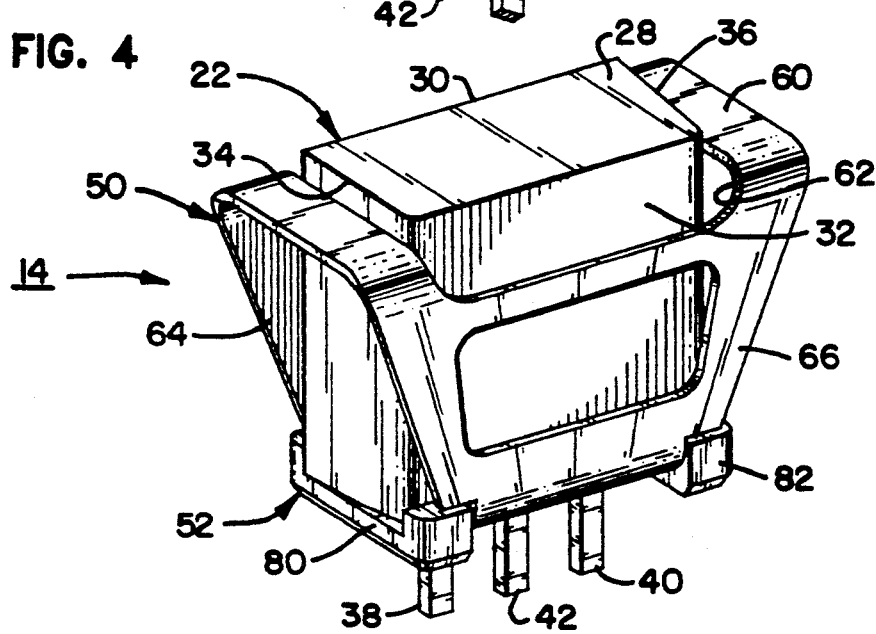
FIG. 4 is a top, side and end perspective view of an overvoltage protection assembly according to the present invention.

Spring member 50 includes a cap end 60 having an opening 62 sized to receive end 28 of thyristor 22 (as shown in FIG. 4). First and second side walls 64,66 extend in general parallel alignment from cap 60 and are biased to be angled toward one another as shown in FIG. 13. Each of arms 64,66 terminates at first and second, respectively, inwardly projecting flanges 68,70. Disposed on opposite ends of flange 68 are first and second contact ends 72,74. A third contact end 76 is centrally disposed on flange 70. As shown in FIGS. 11-13, when the spring 50 is in its rest or biased position, flange 68 is urged toward flange 70.

Figure 5:
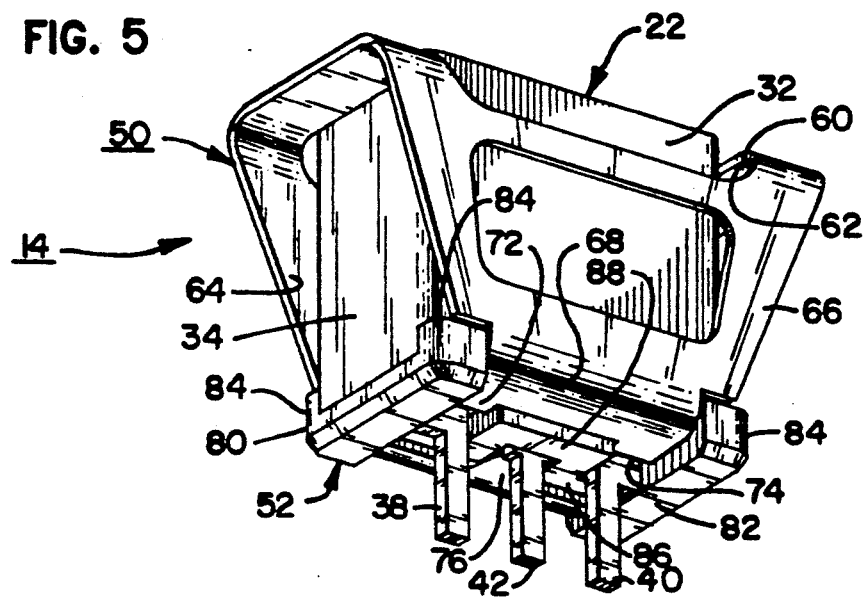
FIG. 5 is a bottom, side and end perspective view of the assembly of FIG. 4.
Figure 9:
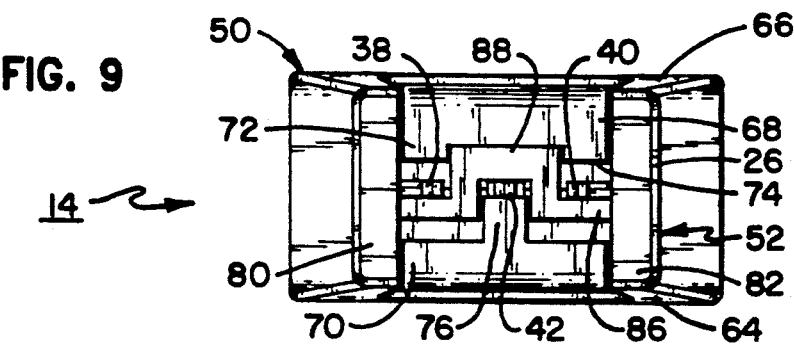
FIG. 9 is a bottom plan view of the assembly of FIG. 4.

As shown in FIGS. 5 and 9, the side arms 64,66 extend opposing opposite sides 30,32 of thyristor 22. When the spring member 50 is assembled on thyristor 22, the first and second contact ends 72,74 are disposed opposing the tip and ring leads 38,40. The third contact end 76 is disposed opposing the ground lead 42. As best shown in FIG. 12, the ground lead 76 has a length (i.e., the distance from flange 70) greater than the length (i.e., the distance from flange 68) of first and second contact ends 72,74.

Figure 10:
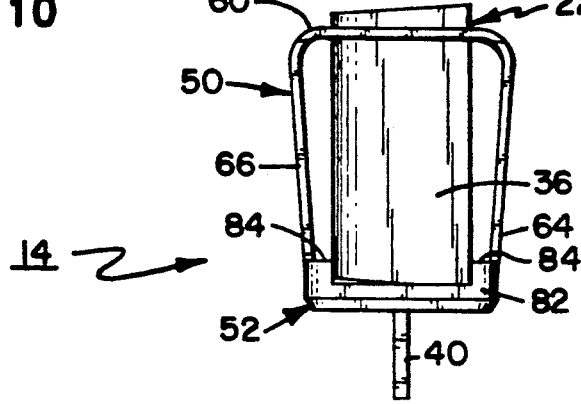
FIG. 10 is an end elevation view of the assembly of FIG. 4.

Spacer 52 is provided to maintain spring arm 64,66 spaced away from their rest position (shown in FIG. 13) to a stressed position shown in FIGS. 9 and 10. The spacer 52 is preferably formed of dielectric material (e.g. thermoplastics) which is deformable at the elevated temperature generated by the thyristor 22 upon the failure to ground. Specifically, the spacer 52 is deformable in response to the force of the bias of the stressed spring arms 64,66.

Figure 6:
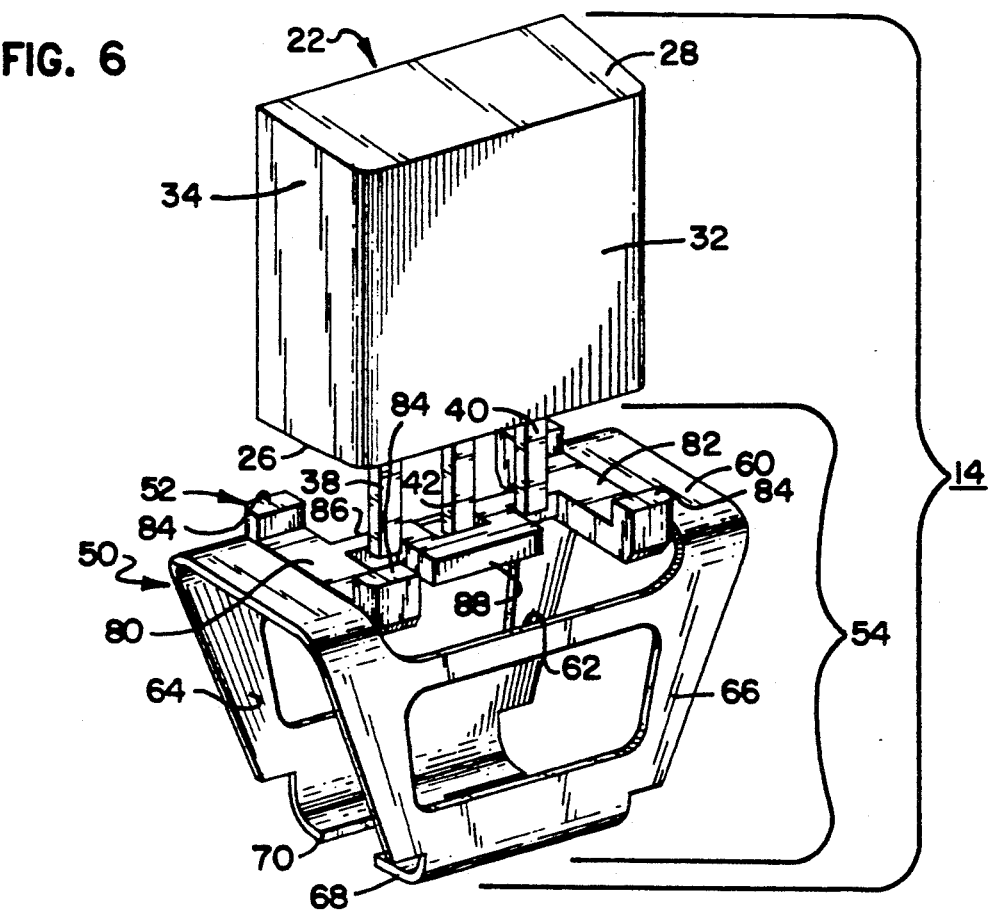
FIG. 6 is an exploded view of the assembly of FIG. 4.
Figure 7:
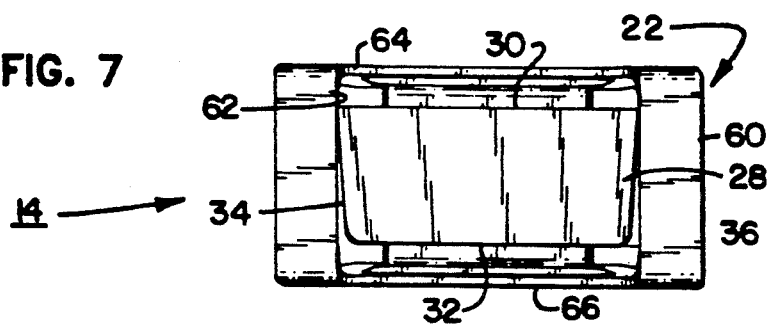
FIG. 7 is a top plan view of the assembly of FIG. 4.
Figure 8:
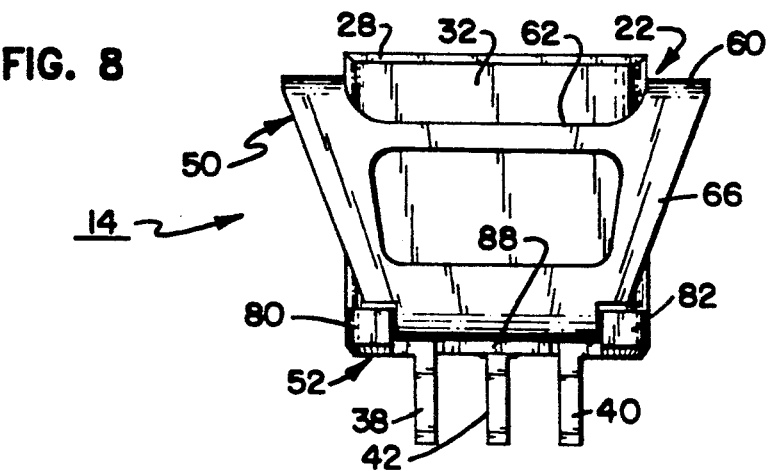
FIG. 8 is a side elevation view of the assembly of FIG. 4.

With reference to FIGS. 5, 6 and 9, the spacer 52 includes parallel spaced-apart transverse end bars 80,82 having upwardly projecting tabs 84 spaced apart and sized to receive thyristor body between the tabs 84. The bars 82 are joined by a longitudinally extending rib 86. The rib 86 has a central U-shaped portion 88. Rib 86 is disposed to abut a side of tip and ring leads 38,40 opposing flange 70 (best shown in FIG. 9). Central U-shaped portion 88 is disposed to abut a side of ground lead 42 opposing flange 68.

U-shaped portion 88 spaces flange 68 against the bias of the spring member 50 such that first and second contact ends 72,74 are retained spaced from tip and ring leads 38,40. (Also, no dielectric material obstructs the opposition of ends 72,74 to leads 38,40.) In contrast, due to the fact third contact end 76 has a length greater than that of ends 72,74, ground lead 42. Accordingly, ground lead 42 is in direct contact with third contact end 76 (as shown in FIG. 9).

The spacer end bars 82 have a thickness selected greater than a thickness of the flanges 68,70. As a result, the end bars 82 act as a spacer to space the spring member 50 away from the printed circuit board 12 when the assembly 14 is mounted on a printed circuit board 12.

As shown from the foregoing structure, the spring 50 is in electrical contact with the ground lead 42 but out of electrical contact with tip and ring leads 38,40. Further, the spring 50 (which is formed of electrically conductive material) is maintained in spaced relation from printed circuit board 12 to avoid electrical contact between the spring and circuit paths on the circuit board 12. During normal operation, if an overvoltage condition is sensed by the thyristor 22, the thyristor grounds either of the tip or ring leads 38,40 to the ground lead 42. In the event of prolonged grounding, the thyristor 22 will overheat. In response to the heating of thyristor 22, the material of spacer 52 softens. The softened material is deformable in response to the biasing force of the spring 50 such that the U-shaped member 88 deforms to permit contact ends 72,74 to come into electrical contact with tip and ring leads 38,40. As a result, grounding is achieved by reason of the electrical circuit generated between the connection of the tip or ring leads 38,40 to the ground lead 42 via the electrically conductive spring 50.

In the foregoing detailed description of the present invention, it has been shown how the objects of the invention have been attained in a preferred manner. However, modifications and equivalents of the disclosed concepts, such as those which would readily occur to one skilled in the art, are intended to be included within the scope of the present invention.

What is claimed is:

1. A fail-safe device for a thyristor having a body member with extending tip lead, ring lead and ground lead, said thyristor including means for grounding either of said tip or ring leads upon detection by said thyristor of an overvoltage condition, said thyristor characterized by said thyristor attaining an elevated temperature in event of prolonged grounding, said fail-safe device, comprising:

an electrically conductive spring member having first, second and third contact ends;

said spring member sized to be fitted over said thyristor body member with said first contact end opposing said tip lead, said second contact end opposing said ring lead and said third contact end opposing said ground lead;

said spring member dimensioned for said first, second and third contact ends to be biased toward a position with said first, second and third contact ends in electrical contact with said tip, ring and ground leads, respectively;

spacer means disposed to space said first and second contact ends from said tip and ring leads; and said spacer means formed from a material selected to deform under a force of said bias at said elevated temperature to permit said contact ends to move under influence of said bias to said position.

2. A fail-safe device according to claim 1 wherein said tip lead, ring lead, and ground lead extend in generally parallel alignment from a predetermined side of said thyristor, said spring member including a cap portion sized to surround an upper end of said thyristor opposite said common side, said device having side wall portions extending from said cap with said contact ends bending inwardly from said side wall portions toward said leads.

3. A fail-safe device according to claim 1 wherein said spring member includes first and second terminal ends opposing opposite sides of said tip, ring and ground leads, said first and second contact ends disposed on said first terminal end and said third contact end disposed on said second terminal end; and said spacer means including dielectric, heat deformable material disposed urging said first and second terminal ends apart in opposition to a bias of said spring member.

4. A fail-safe device according to claim 3 wherein said spacer means is selected for said third contact ends to be in electrical contact with said ground lead and with said first and second contact ends to be spaced from and out of electrical contact with said tip and ring leads, respectively.

5. A fail-safe device according to claim 4 wherein said spacer means includes a portion of dielectric, heat deformable material spaced between said ground lead and said first terminal end.

6. A fail-safe device for a thyristor having a body member with extending tip lead, ring lead, and ground lead, said thyristor including means for grounding either of said tip or ring leads upon detection by said thyristor of an overvoltage condition, said thyristor characterized by said thyristor attaining an elevated temperature in the event of prolonged grounding, said fail-safe comprising:

an electrically conducted spring member having first, second and third contact ends;

means for connecting said spring member to said thyristor body member with said first contact end opposing said tip lead, said second contact and opposing said ring lead and third contact and opposing said ground lead;

said spring member dimensioned for said first, second and third contact ends to be biased toward a position with said first, second and third contact ends in electrical contact with said tip, ring and ground leads, respectively;

spacer means disposed to space at first and second contact ends from said tip and ring leads; and said spacer means formed from a material selected to deform under a force of said bias at said elevated temperature to permit said contact ends to move influence of said bias to said position;

said spacer means including means to space at first and second contact ends from said tip and ring leads without material of said spacer means disposed between said first contact end and said tip lead and without said material being disposed between said second contact end in said ring lead.

* * * * *